UNITED STATES PATENT OFFICE.

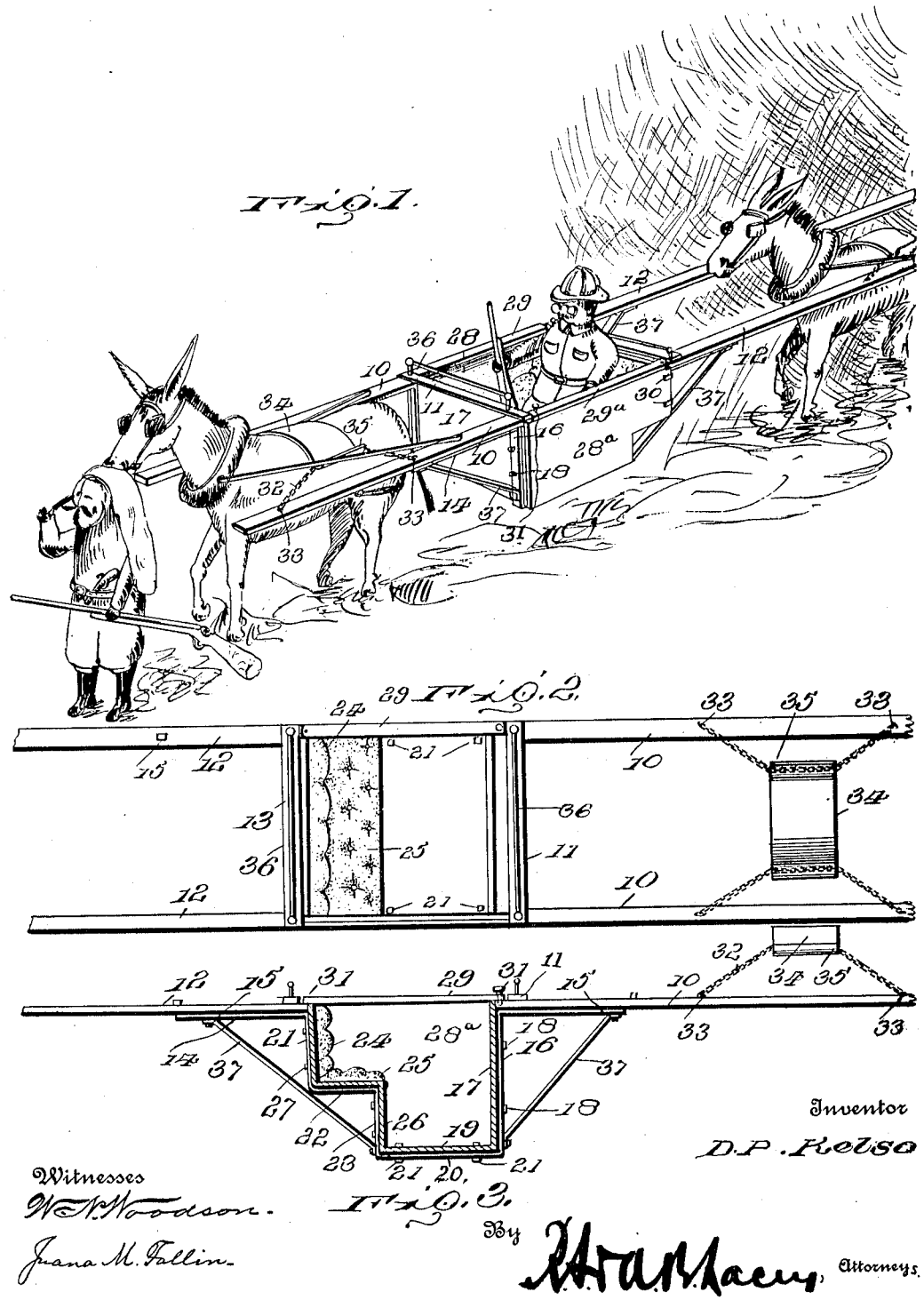

DAVID P. KELSO, OF SLATER, WASHINGTON.

SEDAN.

1,020,987. Specification of Letters Patent. Patented Mar. 26, 1912.

Application filed November 23, 1910. Serial No. 593,919.

*To all whom it may concern:*

Be it known that I, DAVID P. KELSO, a citizen of the United States, residing at Slater, in the county of Walla Walla and State of Washington, have invented certain new and useful Improvements in Sedans, of which the following is a specification.

This invention relates to an improved sedan, and more particularly to a device of this character adapted to be supported upon the back of animals arranged in tandem fashion.

An object of this invention is to provide a sedan with forward and rear shafts which are connected together in such a manner as to provide a substantial frame capable of supporting a considerable weight and strain incident to the movement of the animals which are attached to the shafts.

For a full understanding of the invention reference is to be had to the following description and accompanying drawing in which:

Figure 1 is a perspective view of the improved sedan supported upon two animals. Fig. 2 is a top plan view of the sedan. Fig. 3 is a side elevation of the improved sedan having the side-wall thereof removed.

Corresponding and like parts are referred to in the following description and indicated in all the views of the accompanying drawing by the same reference characters.

Referring to the drawing the numerals 10 designate the forward shafts of the device which are spaced apart to accommodate the animal which is to be attached thereto and are firmly held in such spaced relation by a cross-brace 11. Rear-shafts 12 are provided having their ends spaced from the rear ends of the shafts 10 and held in spaced relation with one another by a rear cross-brace 13.

From Fig. 2 it will be observed that the shafts 10 and 12 are arranged in longitudinal alinement, the same being held in such position by straps 14. The straps 14 comprise strips of metal of a substantial thickness which are attached at their opposite ends against the under faces of the alining shafts 10 and 12 by clamping bolts 15. The forward ends of the straps 14 are bent downwardly as at 16 at the rear ends of the shafts 10 to provide vertical supports for a front-board 17 which is secured across the straps 16 by detachable clamping bolts 18.
The lower ends of the vertical supports 16 are bent backwardly in a horizontal plane to provide supports for a foot-board 19. The foot-board 19 is detachably secured upon the horizontal supports 20 by detachable bolts 21. The rear portions of the straps 14 are angularly bent as is disclosed in Fig. 3 to provide back-straps 21, seating supports 22 and lower back-supports 23. The respective sections 21, 22 and 23 detachably carry the back 24, seat 25 and the lower backboard 26 which are detachably secured to the respective members by bolts 27.

The sides of the improved device are provided with walls 28 and 28ª completely closing the same. The walls 28 and 28ª carry upon their upper edges guard-rails or arm-rests 29 and 29ª, respectively, the same reaching longitudinally across the adjacent ends of the shafts 10 and 12. The wall 28ª is attached to the back-strap 21 by hinges 30, and is held normally closed by a pin 31. The pin 31 engages through the outer end of the arm rest 29ª and into the rear extremity of the adjacent shaft 12.

Each of the shafts 10 and 12 is provided with a chain 32, or other flexible member which is looped and secured at its free end to the shaft by staples 33. The flexible members or chains 32 are arranged in transverse registration with one another and extend upwardly and are looped over the opposite ends of the saddle-plates 34. The plates 34, as will be observed particularly from Fig. 1, comprise elongated and arched metallic members having upturned lips 35 at their opposite ends for the reception of the central portions of the flexible members 32. The saddle-plates 34 are adapted to rest across the backs of the supporting animals and to thereby carry the improved device. The flexible members 32 are adapted to slide over the upturned lips 35.

The cross-pieces 11 and 13 are provided with guard-rails 36 for the purpose of ornamentation. The straps 14 are reinforced by diagonal braces 37 which extend from the outer extremities of the straps 14 downwardly and inwardly to the horizontal supports 20 where they are suitably attached by bolts or the like. The braces 37 thus serve as reinforcing means for the shafts 10 and 12 and form in conjunction with the straps 14 a rigid main frame for the sedan.

Having thus described the invention what is claimed as new is:—

A sedan comprising metallic side strips having depressed intermediate portions and alined end portions, a body nested in the depressed portions of the strips, braces interposed between the end portions and depressed portions of the strips, said body having a hinged side which extends from the rear to the front side thereof, and shafts attached at their inner portions to the alined end portions of the strips and abutting at their inner ends against the sides of the body.

In testimony whereof, I affix my signature in presence of two witnesses.

DAVID P. KELSO. [L. S.]

Witnesses:
GUY BARTLETT,
JOHN W. BROOKS.